(12) United States Patent
Robl (10) Patent No.: US 10,990,662 B2
(45) Date of Patent: Apr. 27, 2021

(54) METHOD AND SYSTEM FOR OPERATING AN EXTENSION ON A MEASURING TRANSDUCER OF PROCESS AUTOMATION TECHNOLOGY

(71) Applicant: Endress+Hauser Conducta GmbH+Co. KG, Gerlingen (DE)

(72) Inventor: Stefan Robl, Hünxe (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 192 days.

(21) Appl. No.: 16/217,671

(22) Filed: Dec. 12, 2018

(65) Prior Publication Data

US 2019/0180023 A1    Jun. 13, 2019

(30) Foreign Application Priority Data

Dec. 13, 2017 (DE) ..................... 10 2017 129 698.0

(51) Int. Cl.
| | |
|---|---|
| *G06F 21/44* | (2013.01) |
| *G06F 21/10* | (2013.01) |
| *G06F 21/64* | (2013.01) |
| *H04L 9/30* | (2006.01) |

(Continued)

(52) U.S. Cl.
CPC ............ *G06F 21/44* (2013.01); *G06F 21/105* (2013.01); *G06F 21/64* (2013.01); *H04L 9/30* (2013.01); *H04L 9/3247* (2013.01); *H04L 9/3271* (2013.01); *H04L 63/0442* (2013.01); *H04L 63/123* (2013.01); *G06F 2221/0735* (2013.01); *G06F 2221/2103* (2013.01);

(Continued)

(58) Field of Classification Search
CPC ....... H04L 9/3226; H04L 9/30; H04L 9/3247; H04L 9/3271; H04L 63/0442; H04L 63/123; G06F 21/44; G06F 21/105; G06F 21/64

See application file for complete search history.

(56) References Cited

U.S. PATENT DOCUMENTS

| | | | |
|---|---|---|---|
| 9,710,984 B2 * | 7/2017 | Benkert | H04W 4/38 |
| 10,057,243 B1 * | 8/2018 | Kumar | G06F 21/575 |

(Continued)

FOREIGN PATENT DOCUMENTS

| | | |
|---|---|---|
| DE | 102007039530 A1 | 2/2009 |
| EP | 1128242 A2 | 8/2001 |

OTHER PUBLICATIONS

Search Report for German Patent Application No. 10 2017 129 698.0 21, German Patent Office, dated Oct. 10, 2018, 9 pp.

(Continued)

*Primary Examiner* — Oleg Korsak
(74) *Attorney, Agent, or Firm* — Mark A. Logan; Endress+Hauser (USA) Holding Inc.

(57) ABSTRACT

The present disclosure discloses a method for operating an expansion of a measuring transducer of process automation technology, comprising at least the steps: Starting the measuring transducer by starting its operating software; connecting the extension to the measuring transducer; establishing data communication between extension and measuring transducer, wherein the extension and the measuring transducer form an asymmetric cryptosystem; and the extension interacts with the measuring transducer.

18 Claims, 6 Drawing Sheets

(51) Int. Cl.
*H04L 9/32* (2006.01)
*H04L 29/06* (2006.01)

(52) U.S. Cl.
CPC ........... *G06F 2221/2129* (2013.01); *G06F 2221/2137* (2013.01); *H04L 2209/80* (2013.01)

(56) References Cited

U.S. PATENT DOCUMENTS

| | | | | |
|---|---|---|---|---|
| 2004/0059917 | A1* | 3/2004 | Powers | H04L 63/123 713/176 |
| 2005/0144437 | A1* | 6/2005 | Ransom | G06F 21/73 713/151 |
| 2010/0287379 | A1* | 11/2010 | Wittmer | G06F 21/31 713/179 |
| 2013/0138964 | A1 | 5/2013 | Joyce, III | |
| 2015/0046701 | A1* | 2/2015 | Rooyakkers | H04L 9/3263 713/156 |
| 2015/0046710 | A1* | 2/2015 | Clish | G06F 21/445 713/169 |
| 2015/0154136 | A1* | 6/2015 | Markovic | H04L 12/6418 710/317 |
| 2016/0063785 | A1* | 3/2016 | Benkert | H04L 63/0869 340/5.23 |
| 2017/0147807 | A1* | 5/2017 | Rooyakkers | H04L 63/0861 |
| 2017/0237623 | A1 | 8/2017 | Hopkins et al. | |
| 2019/0163912 | A1* | 5/2019 | Kumar | H04L 9/0825 |
| 2019/0200844 | A1* | 7/2019 | Shelton, IV | A61B 18/1445 |

OTHER PUBLICATIONS

Swoboda, Joachim, Spitz, Stephan and Pramateftakis, Michael, Kryptographie und IT-Sicherheit Grundlagen und Anwedungen, 2008, 12 pp. (English Translation Provided).

* cited by examiner

METHOD AND SYSTEM FOR OPERATING AN EXTENSION ON A MEASURING TRANSDUCER OF PROCESS AUTOMATION TECHNOLOGY

CROSS-REFERENCE TO RELATED APPLICATION

The present application is related to and claims the priority benefit of German Patent Application No. 10 2017 129 698.0, filed on Dec. 13, 2017, the entire contents of which are incorporated herein by reference.

TECHNICAL FIELD

The present disclosure relates to a method for operating an extension on a measuring transducer of process automation technology. The present disclosure further relates to a system for implementing the method.

BACKGROUND

Generally speaking, a measuring transducer is a device that converts an input variable into an output variable according to a fixed relationship. In process automation technology, a sensor is, for example, connected to a measuring transducer. The raw measured values of the sensor are processed in the measuring transducer, e.g., averaged or converted by means of a calibration model to another variable—for example, the process variable to be determined—and possibly transmitted—to a control system, for example.

Generally, a cable for connection to the sensor is connected to the measuring transducer. The measuring transducer is in this case a separate device with a separate housing and various interfaces. Alternatively, the measuring transducer can be integrated, e.g., in the form of a circuit—possibly as a microcontroller or something similar—into a cable or directly into a plug connection (see below).

The connection of the cable to the sensor is frequently accomplished via a plug connection, e.g., by galvanically decoupled—especially, inductive—interfaces. Thus, electrical signals can be transmitted contactlessly. Advantages with regard to corrosion protection, electrical isolation, prevention of mechanical wear of the plug, etc., are shown by this galvanic isolation. The applicant markets such systems under the name, "Memosens."

The most varied sensors can be connected to the measuring transducer. Under the aforementioned name, "Memosens," the applicant markets sensors for measuring pH value, conductivity, oxygen, turbidity, and other things.

The field device connected to the measuring transducer, i.e., the sensor, for example, is parameterized, and other settings are changed via the measuring transducer. For this purpose, the measuring transducer has a display and possibilities for making entries, e.g., via buttons, switches, touch display or via external devices that are connected to the measuring transducer via a wireless or wired interface (such as USB, serial or parallel interface, RS-232, Bluetooth, etc.).

Generally, "authenticity" means authenticity in the sense of "found as original". For the purposes of this application, authenticity means "are the data actually coming from the <<correct>>sender?" Applied to the aforementioned measuring transducer, the question is: Is the connected sensor really the sensor that it says it is?

In general, "integrity" means the correctness (integrity) of data and the correct functioning of systems. Applied to the aforementioned measuring transducer, the question is: Were the data received by the measuring transducer unaltered, and are they therefore identical to the data which were sent by the sender (here: the sensor)?

SUMMARY

The object of the present disclosure is to check the reliability of the communication between the sensor and the measuring transducer.

The object is achieved by a method comprising the steps of: Starting the measuring transducer by starting its operating software; connecting the extension to the measuring transducer; establishing data communication between extension and measuring transducer, wherein the extension and the measuring transducer form an asymmetric cryptosystem; and the extension interacts with the measuring transducer.

An asymmetric cryptosystem is a cryptographic method in which the communicating parties (here: measuring transducer and extension) need not know a common secret key. In general, each user generates his own key pair comprising a secret part (private key) and a non-secret part (public key). The public key enables anyone to encrypt data for the owner of the private key, check his digital signatures or authenticate himself. The private key allows its owner, to encrypt data with the public key, to generate digital signatures or authenticate himself.

Within the meaning of this application, an "extension" changes the function of the measuring transducer. This can be, for example, expanded or supplemented functions or an expanded or supplemented functional scope of the measuring transducer. At least two embodiments of the extension are possible. On the one hand, the extension is configured as hardware such as a sensor which can be connected to the measuring transducer. On the other hand, the extension is configured as software. An extension is not primarily a part of the measuring transducer, i.e., it is explicitly not part of the operating system. The extension is loaded at runtime. The extension is, in particular, loaded from a memory at runtime. The memory can in this case be implemented as memory firmly integrated into the hardware of the measuring transducer (e.g., flash memory), in the form of removable memory accessible to the user (e.g., a memory card), or in the form of a network memory that is addressed by data communication (e.g., a file server). In one embodiment, the extension configured as software is transmitted to the measuring transducer by the extension that is connected to the measuring transducer and designed as hardware, such as a sensor.

Generally, in this embodiment the extension is thus software code that is formulated in a certain (programming) language and executed on the measuring transducer.

In one embodiment, the method further comprises the steps: Performing a challenge-response method between the extension and the measuring transducer; and determining the authenticity of the extension.

Of course, the opposite direction is also possible, namely the execution of a challenge response method between the measuring transducer and the extension to determine the authenticity of the measuring transducer from the point of view of the extension.

The challenge-response method is generally an authentication method of a subscriber based on knowledge. In this case, a subscriber poses a task (challenge) that the other must solve (response) in order to prove that he has knowledge about a specific piece of information. If a first party wants to authenticate itself to a second party, then the second party sends a random message, such as a random number, to the first party (i.e., the second party poses the challenge). The first party supplements this random message with its password, applies a cryptological hash function or encryption to that combination, and sends the result to the second party (and thus provides the response). The second party, knowing both the random message and the shared secret (=first party password) and the hash function or encryption used, performs the same calculation and compares its result with the response it receives from the first party. If both data are identical, the first party has successfully authenticated itself.

In one embodiment, the method thus further comprises the steps: The measuring transducer sends a message known to the extension, in particular a random message, to the extension; a signature from the unknown message is calculated by the extension by means of a signature key located thereupon; at least the signature is sent to the measuring transducer; and the measuring transducer verifies the signature by means of a verification code already present therein.

The signature key is the private key; the verification key is the public key.

In particular if the extension is configured as a sensor, the authenticity thereof can thus be determined. This method can check whether the connected sensor is actually the sensor that a claims to be; or in other words an "original sensor".

Of course the reverse direction is also possible, i.e., the extension sends a message known to the measuring transducer, in particular a random message, to the extension; a signature from the unknown message is calculated by the measuring transducer by means of a signature key located thereupon; at least the signature is sent to the extension; and the extension verifies the signature by means of a verification code already present therein. This allows the sensor to deny operation to an invalid measuring transducer.

In one embodiment, the extension comprises a digital signature, and the method further comprises the step of: The integrity of the extension is determined by the measuring transducer by means of a verification key already present therein.

The verification key is a public key, but not necessarily the same as the one mentioned above.

Especially when the extension is designed as loadable software, the integrity thereof can thus be determined. The extension (software) itself is signed. It is thus possible to determine whether the software to be loaded has been manipulated.

In one embodiment, the digital signature is generated by means of a signature key, in particular by the manufacturer of the extension.

The signature key is a private key, but not necessarily the same as that mentioned above.

In one embodiment, further data communication is denied if the authenticity or integrity is not confirmed. It can thus be ensured that an extension that is not authenticated or integrious does not continue to operate.

In one embodiment, the method further comprises the step of: Activating a limited functional scope of the measuring transducer if the authenticity is not confirmed.

In one embodiment, if the authenticity or integrity is not confirmed, the functional operation is limited over time.

In one embodiment, the method further comprises the steps: Sending a license to the measuring transducer, wherein the license comprises a digital signature; and the measuring transducer checks the integrity and authorship by means of a verification key already present therein.

In one embodiment, a license is sent to the extension, wherein the license comprises a digital signature; and the integrity and authorship of the license is checked by the extension by means of a verification key already present therein.

In particular if the extension is configured as a sensor, further safety properties can thus be assigned by the license.

In one embodiment, the license is tied to at least one of the following characteristics: serial number, serial number range, manufacturer, type, genre or hardware components. This ensures that a certain license can only work with a certain extension.

In one embodiment, the license defines the functional scope and authorizations in the measuring transducer. The license thus makes it possible for certain functionalities of the extension to be enabled or restricted.

In one embodiment, the extension enters the license on a display/displays and input device(s) connected to the measuring transducer or arranged therein by means of a storage medium from the Internet, or transmits it to or activates it on the measuring transducer by means of a wireless connection, in particular by means of a mobile device and app running thereon.

In one embodiment, the measuring transducer transmits the license to or activates it for the extension.

The object is further solved by a system for implementing a method as described above.

In one embodiment, the extension is configured as a sensor of process automation technology.

In one embodiment, the signature key is located on a sensor storage area that cannot be read out from the outside. In one embodiment, the sensor comprises a trusted platform module.

A trusted platform module is a chip according to the TCG specification (The Trusted Computing Group (TCG) is an industry-operated standardization organization that develops an open standard for trusted computing platforms) that expands a computer or similar devices with basic safety functions. The module behaves in some points like an integral smartcard, but with the important difference that it is not bound to a specific user (user instance) but to the local computer (hardware instance).

In one embodiment, the extension is configured as a software module which can be uploaded to the measuring transducer in order to expand its functional scope.

BRIEF DESCRIPTION OF THE DRAWINGS

This will be explained in more detail with reference to the following figures.

DETAILED DESCRIPTION

In the figures, the same features are identified with the same reference symbols.

The claimed measuring transducer 20 is for example used in a system 10. In addition to the measuring transducer 20, the system 10 comprises a sensor 1 and a connection element 11, which shall be discussed first. Without limitation of generality, a "sensor 1" is spoken of below; even so, an actuator or the like may, however, also be connected to the measuring transducer 20. Generally, a field device is connected to the measuring transducer 20.

Figure 1A:
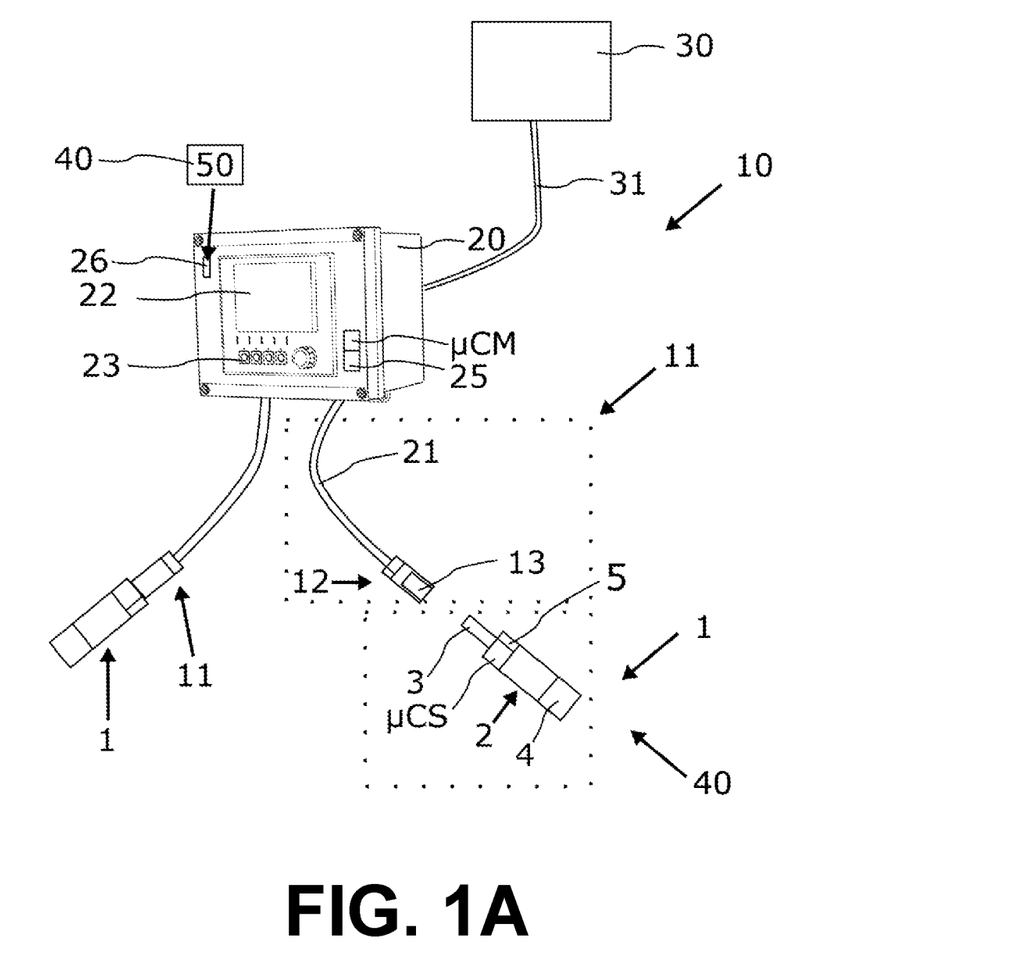
FIGS. 1A and 1B shows the claimed system comprising a measuring transducer in two different embodiments.

FIG. 1A represents an embodiment of a system 10.

A sensor 1 communicates with a measuring transducer 20 via a first physical interface 3. The transducer 20 comprises a data processing unit μCA, for instance in the form of a microcontroller, and—separately or part thereof—a memory 25. The measuring transducer 20 comprises at least one slot 26 for a memory card, such as an SD card.

The measuring transducer 20 in turn is connected to a higher-level unit 30, such as a control system, by a cable 31. A cable 21 is connected on the sensor side to the measuring transducer 20, the other end of which cable comprises a second physical interface 13 that is complementary to the first physical interface 3. A connection element 11 comprises the cable 21, along with the second physical interface 13. The physical interfaces 3, 13 are designed as electrically isolated—in particular, inductive—interfaces. The physical interfaces 3, 13 can be coupled with each other by means of a mechanical plug connection. The mechanical plug connection is hermetically sealed, so that no fluid, such as the medium to be measured, air, or dust, can enter from the outside.

Data (bi-directional) and power (uni-directional, i.e., from the connection element 11 to the sensor 1) are transmitted or transferred via the physical interfaces 3, 13. The system 10 is used predominantly in process automation.

The sensor 1 comprises at least one sensor element 4 for detecting a measurand of process automation. The sensor 1 is then, for example, a pH sensor, also called an ISFET design—generally, an ion-selective sensor, a sensor for measurement of the redox potential from the absorption of electromagnetic waves in the medium, e.g., with wavelengths in the UV, IR, and/or visible range, of the oxygen, of the conductivity, of the turbidity, of the concentration of non-metallic materials, or of the temperature, along with the respectively corresponding measurand.

The sensor 1 comprises a first coupling body 2, which comprises the first physical interface 3. As mentioned, the first physical interface 3 is designed for the transmission to a second physical interface 13 of a value that is a function of the measurand. The sensor 1 comprises a data processing unit μCS, such as a microcontroller, which processes the values of the measurand, e.g., converts them into a different data format. The data processing unit μCS is designed for energy and space reasons to be rather small or economical with respect to the computing capacity and the memory volume. The sensor 1 is thus designed only for "simple" computing operations—for example, for averaging, preprocessing, and digital conversion. The sensor 1 comprises one or more memories 5 separately or as part of the data processing unit μCS.

Several sensors 1 can also be connected to a measuring transducer 20. Shown in FIG. 1A are two sensors 1, wherein only one of the two is provided with all of the reference symbols. The same or different sensors can be connected. The left one of the two is shown in the plugged-in state. Up to eight sensors can be connected to the measuring transducer 20, for example.

The sensor 1 can be connected via the physical interfaces 3, 13 to the connection element 11, and ultimately to the measuring transducer 20. The data processing unit μCS converts the value that depends upon the measurand (i.e., the measurement signal of the sensor element 4) into a protocol that the measuring transducer 20 can understand. An example in this regard is, for example, the proprietary Memosens protocol. The first and second physical interfaces 3, 13 are thus designed for the bi-directional communication between the sensor 1 and the measuring transducer 20. As mentioned, in addition to the communication, the first and second physical interfaces 3, 13 also ensure the supply of power to the sensor 1.

The connection element 11 comprises the second physical interface 13, wherein the second physical interface 13 is designed to be complementary to the first physical interface 3.

The connection element 11 comprises a second, cylindrical coupling body 12 that is designed to be complementary to the first coupling body 2 and can be slipped with a sleeve-like end portion onto the first coupling body 2, wherein the second physical interface 13 is plugged into the first physical interface 3. An opposite arrangement, in which the second physical interface 13 is designed to be sleeve-like and the first physical interface 3 is designed to be plug-like, is possible, without any inventive effort.

The measuring transducer 20 comprises a display 22 and one or more operating elements 23, such as buttons or rotary buttons, by means of which the measuring transducer 20 can be operated. Measured data, for example, of the sensor 1 are displayed by the display 22. The sensor 1 can also be configured and parameterized by means of the operating elements 23 and the corresponding view on the display 20.

The measuring transducer 20 forwards the measured data via the cable 31, as mentioned, to a control system 30, for example. The control system 30 is in this case designed as a process control system (PLC, SPS), PC, or server.

To this end, the measuring transducer 20 converts the data into a data format that the control system can understand, e.g., into a corresponding bus, such as HART, Profibus PA, Profibus DP, Foundation Fieldbus, Modbus RS485, or even into an Ethernet-based field bus, such as EtherNet/IP, Profinet, or Modbus/TCP. These data are then forwarded to the control system 30. This can, if required, be combined with a web server, i.e., they can be operated in parallel to one another.

Figure 1B:
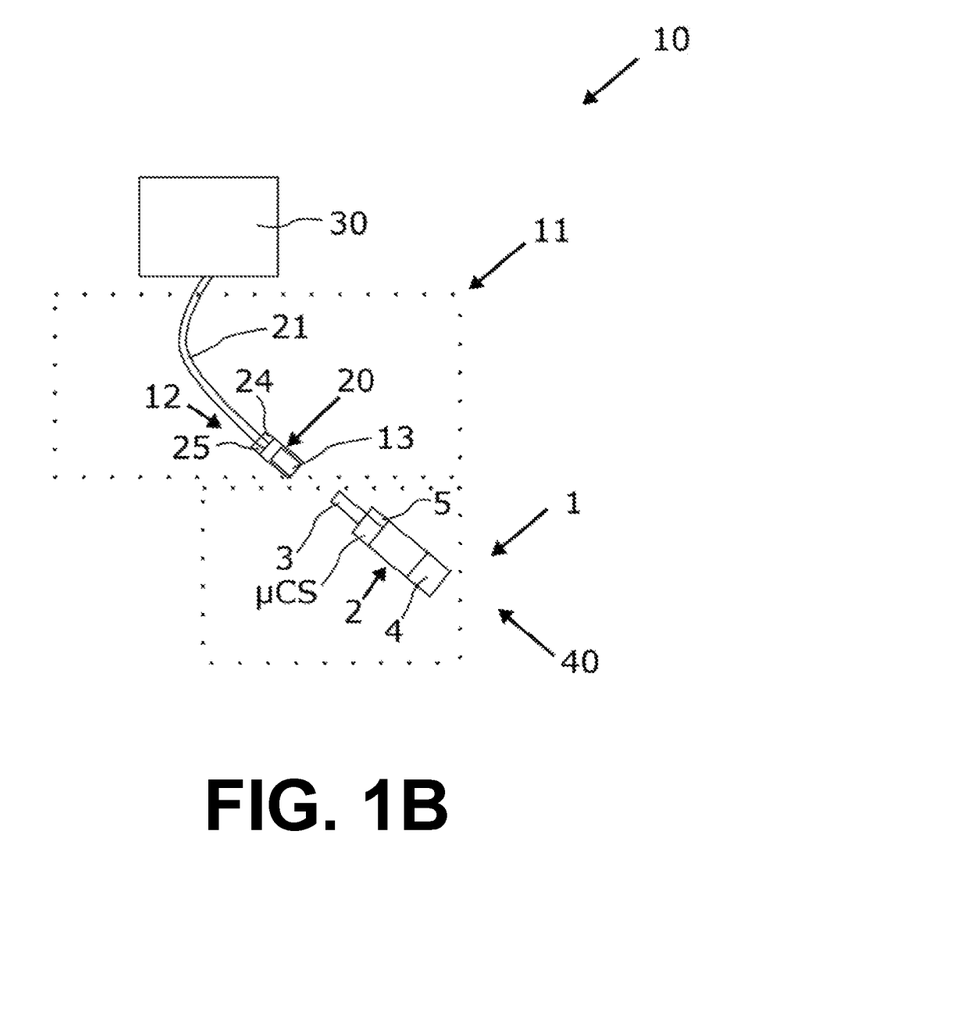

FIG. 1B represents an embodiment of a sensor arrangement 10. In this case, only one sensor 1 is respectively connected to a measuring transducer 20. The measuring transducer 20 is in this case illustrated symbolically as a rectangle, is smaller in its dimensions than the measuring transducer from FIG. 1A, and is approximately the size of a matchbox. The measuring transducer 20 can in this case be designed as a separate unit that can be connected to the cable 21 or, as shown here, be integrated directly into the cable 21. The measuring transducer 20 thus consists essentially of the data processing unit μCA. The measuring transducer 20 does not include a display and has, if any, only one or two operating elements, which are configured for a reset or for turning on and off. In this embodiment, the measuring transducer 20 preferably comprises no operating elements. The measuring transducer 20 therefore comprises a wireless module 24, such as a Bluetooth module, with the protocol stack, Bluetooth Low Energy. A mobile device (not shown), such as a cellphone, tablet, laptop, etc., can thereby be wirelessly connected to the measuring transducer 20. By means of the mobile device, the sensor can be configured and parameterized using the wireless connection via the wireless module 24. The measuring transducer 20 converts the raw measured data such that they are directly transmitted to a higher-level unit 30, such as the control system. As mentioned, data can, for example, be transmitted in a proprietary protocol from the sensor 1 to the connection element 11, while the data processing unit μCA converts this proprietary protocol into a bus protocol (Modbus, Foundation Fieldbus, HART, Profibus, EtherNet/IP; see above).

The firmware of the measuring transducer 20 can also be updated via the wireless module 24.

Also in the embodiment of the measuring transducer 20 from FIG. 1A, this can also contain a wireless module (not shown).

The measuring transducers in FIG. 1A and FIG. 1B essentially have the same basic functionality.

Figure 2:
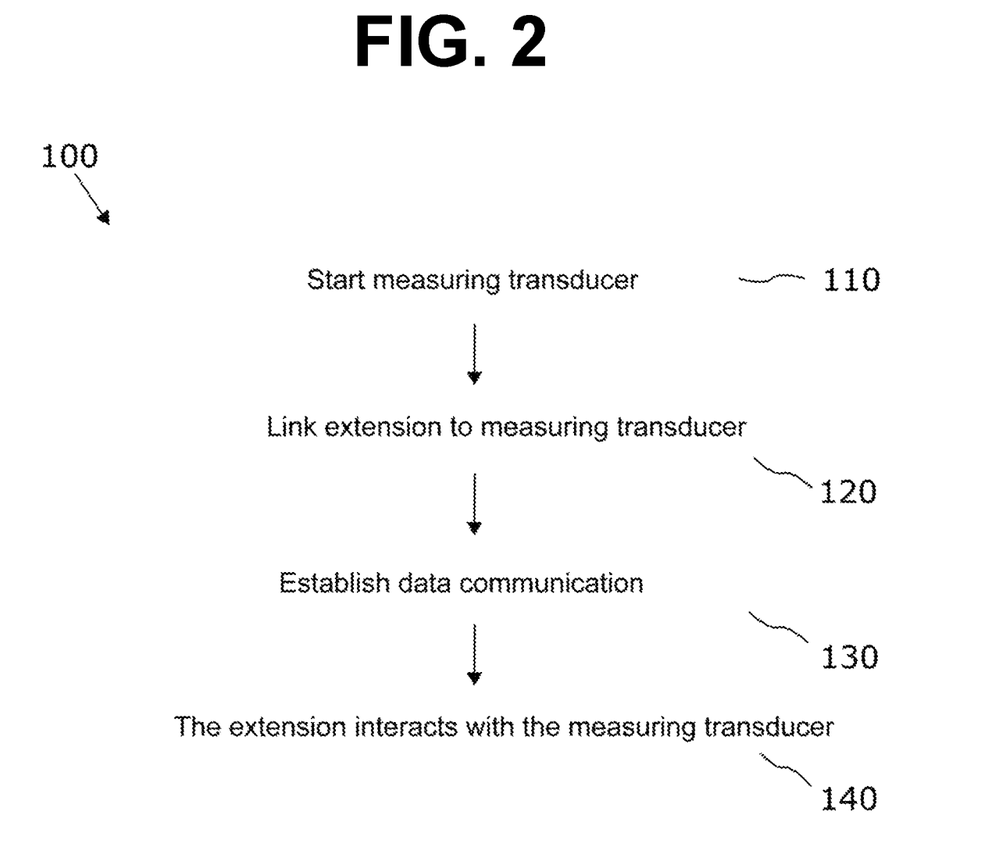
FIG. 2 shows the claimed method in an overview.

FIG. 2 shows the claimed method 100 in an overview. Initially in a first step 110, the measuring transducer is started by starting its operating software. In the next step 120, an extension is connected to the measuring transducer. Then (reference numeral 130) data communication between extension and measuring transducer is established. The extension and the measuring transducer form an asymmetric cryptosystem. In the last step 140, the extension interacts with the measuring transducer.

Within the meaning of this application, an "extension 40" changes the function of the measuring transducer 20. These can be, for example, expanded or supplemented functions, or an expanded or supplemented functional scope of the measuring transducer 20. At least two embodiments of the extension are possible. On the one hand, the extension 40 is configured as hardware, such as a sensor 1, that can be connected to the measuring transducer 20. On the other hand, the extension is configured as software 50. Generally in this embodiment, the extension 40 is thus software code that is formulated in a certain (programming) language and executed on the measuring transducer. The software 50, as an extension 40, is not primarily part of the measuring transducer 20, i.e., it is explicitly not part of the operating system. The extension 40 is loaded during runtime. In particular, the extension is loaded during runtime from a memory such as from the memory 5 of the sensor 1. The software 40 can be loaded from the memory 5 of the sensor 1 into the memory 25 of the measuring transducer 20. Furthermore, when the measuring transducer 20 is delivered, the software 50 can already be in its memory 25. Likewise, the software 50 may be loaded into the measuring transducer 20 via a memory card by means of the card slot 26. Wireless transmission into the memory 25 or via a network connection of the measuring transducer 20 is also possible.

The memory 5 of the sensor 1 comprises a memory area which cannot be read from the outside and on which one or more secret keys privK 1 are located (see below).

The measuring transducer 20 and the extension 40 form an asymmetric cryptosystem. Depending on the type of extension 40, this is configured differently.

In particular, if the extension 40 is configured as a sensor 1, a challenge-response method is carried out between them in order to determine the authenticity of the sensor 1.

Figure 3A:
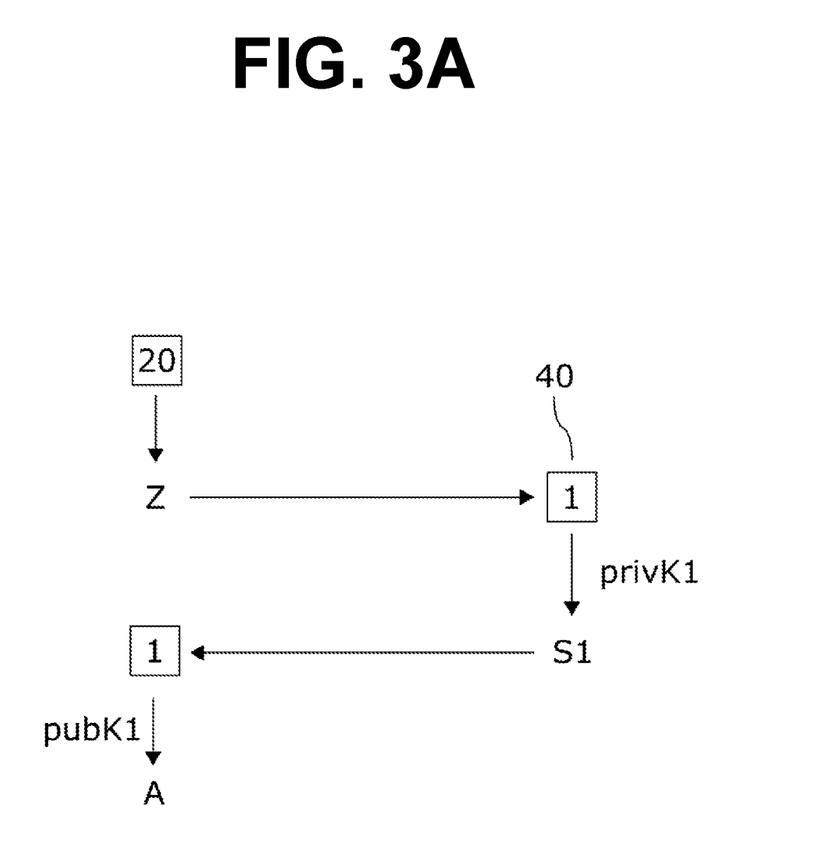
FIGS. 3A and 3B shows a diagram for determining the authenticity of the sensor or measuring transducer.

FIG. 3A shows a diagram for determining authenticity by means of challenge-response methods. The transducer 20 generates a random message Z and sends it as a "challenge" to the sensor 1 as an extension 40. The extension 40 calculates therefrom a signature S1 with a secret key privK 1 (signature key or private key). The signature can be created for example by using a hash function, and a subsequent encryption can take place with the secret key privK1 take place. The extension 40 sends the signature S1 thus generated back to the measuring transducer 20 as a "response". The transducer 20 verifies this signature S1 using a public key pubK1 (verification, public-key) and thereby determines the authenticity A of the extension.

Figure 3B:
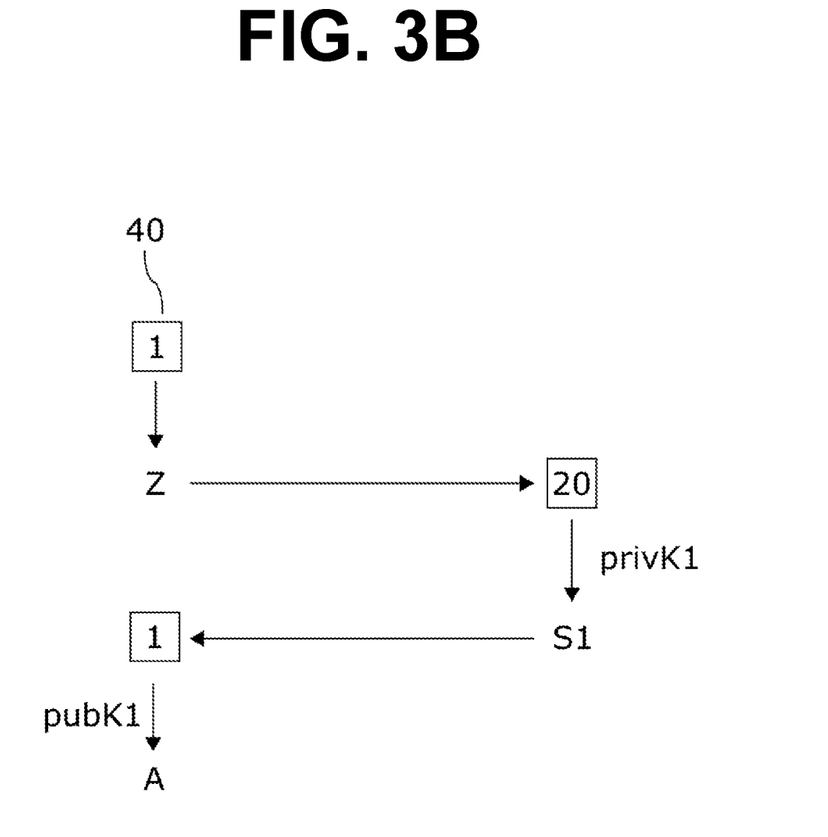

Analogously, the authenticity A of the measuring transducer 20 can be determined by the sensor 1 as an extension 40, see FIG. 3B. In this case, the roles are switched in the above-described challenge-response method: The challenge with the random message Z is sent by the extension 40 to the measuring transducer 20 and is then returned with a signature S1 generated using the signature key privK1 as a response to the extension 40. The extension 40 can determine whether the measuring transducer 20 is authentic by the verification key pubK1 known thereto.

The random message Z generated by the sensor 1 must be cryptographically secure. A random message Z that was used once should ideally never occur again, and no one should be able to deduce the next random message if he knows the last random message Z. Time stamps, which the sensor 1 transmits together with the random message Z, bring about additional security.

In particular in the embodiment of extension 40 just mentioned, a license is sent by the sensor 1 to the measuring transducer 20. This license is provided with a signature and was generated by means of a private key. This private key may, but need not, be the same private key as that discussed above. The measuring transducer 20 checks the integrity and authorship of the license by means of a public key that is already present therein. This public key may, but need not, be the same public key as that discussed above. The license defines the functional scope and authorizations in the measuring transducer. The license is tied to at least one of the following characteristics: serial number, serial number range, manufacturer, type, genre or hardware components of the measuring transducer 20.

A license can also be sent from the measuring transducer 20 to the sensor 1.

In particular, if the extension 40 is configured as software 50, its integrity is determined by means of a signature S.

Figure 4:
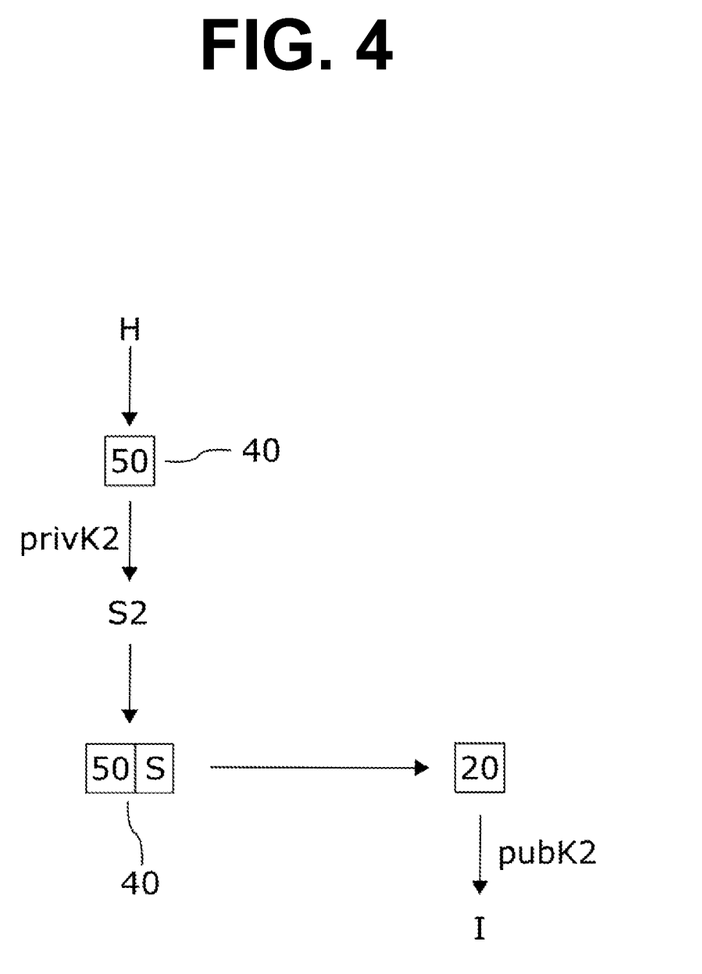
FIG. 4 shows a diagram for determining integrity.

In FIG. 4, initially the manufacturer H of the extension 40 configured as software 50 creates a signature S2 using a private key privK2 (signature key or private-key). The extension 40 thus comprises the signature S2. This private key privK 2 may, but does not have to, be the same private key as that explained above (reference sign privK1 or the private key for generating the signature of the license). Alternatively, the extension 40 is transmitted to the measuring transducer 20, for instance by means of a memory card (card slot 26), wirelessly via a wireless connection, from a network memory or from the sensor 1. The measuring transducer 20 checks the signature by means of a public key pubK2 (public key verification key). This public key pubK2 can, but need not, be the same public key as that explained above (reference numeral pubK1 or the public key for checking the signature of the license). This determines the integrity I of the extension 40.

In both cases, further communication between measuring transducer 20 and extension 40 is denied if the authenticity or integrity has not been confirmed. Alternatively, the functional scope of the measuring transducer 20 is severely limited.

The invention claimed is:

1. A method for operating an extension of a measuring transducer of process automation technology, wherein the extension is a software module that can be uploaded to the measuring transducer to expand a functional scope of the measuring transducer, the method comprising:
   starting the measuring transducer by starting its operating software;
   uploading the extension to the measuring transducer and connecting the extension to the measuring transducer;
   establishing data communication between the extension and the measuring transducer;

forming an asymmetric cryptosystem between the extension and the measuring transducer; and interacting the extension with the measuring transducer.

2. The method according to claim 1, further comprising:
performing a challenge-response method between the extension and the measuring transducer; and
determining an authenticity of the extension.

3. The method according to claim 2, further comprising:
sending a random message unknown to the extension from the measuring transducer to the extension;
calculating a signature on the unknown message by the extension using a signature key located in the extension;
sending the signature to the measuring transducer; and
verifying the signature by the measuring transducer using a verification key present in the measuring transducer.

4. The method according to claim 1, wherein the extension includes a digital signature, the method further comprising:
determining by the measuring transducer an integrity of the extension using a verification key present in the measuring transducer.

5. The method according to claim 4, wherein the digital signature is calculated using a signature key from the manufacturer of the extension.

6. The method according to claim 2, further comprising:
rejecting further data communication if the authenticity is not confirmed.

7. The method according to claim 4, further comprising:
rejecting further data communication if the integrity is not confirmed.

8. The method according to claim 2, further comprising:
activating a limited functional scope of the measuring transducer if the authenticity is not confirmed.

9. The method according to claim 4, further comprising:
activating a limited functional scope of the measuring transducer if the integrity is not confirmed.

10. The method according to claim 2, further comprising:
limiting in time a functional operation of the measuring transducer if the authenticity is not confirmed.

11. The method according to claim 4, further comprising:
limiting in time a functional operation of the measuring transducer if the integrity is not confirmed.

12. The method according to claim 2, further comprising:
sending a license to the measuring transducer, the license including a digital signature; and
verifying by the measuring transducer an integrity and an authorship of the license using a verification key present in the measuring transducer.

13. The method according to claim 12, wherein the license is linked to at least one of the following characteristics: a serial number, a serial number range, a manufacturer, a type, a genre or hardware components of the measuring transducer.

14. The method according to claim 12, wherein the license establishes a functional scope and authorizations in the measuring transducer.

15. The method according to claim 12, wherein the extension enters the license from a storage medium, from the Internet, on a display and input device connected to the measuring transducer or arranged in the measuring transducer, or transmits it to or activates it on the measuring transducer using a wireless connection, including using a mobile device and app running on the mobile device.

16. A system, comprising:
a measuring transducer; and
an extension of the measuring transducer,
wherein the extension is a software module that can be uploaded to the measuring transducer to expand a functional scope of the measuring transducer,
wherein the measuring transducer is configured to establish a data communication between the extension and the measuring transducer, to form an asymmetric cryptosystem with the extension, and to interact with the extension.

17. The system according to claim 16,
wherein the measuring transducer is further configured to send to the extension a random message unknown to the extension,
wherein the extension is configured to calculate a signature on the unknown message using a signature key located in the extension and to send the signature to the measuring transducer, and
wherein the measuring transducer is further configured to verify the signature using a verification key present in the measuring transducer.

18. A measuring transducer configured to execute a method including:
starting the measuring transducer by starting its operating software;
uploading an extension to the measuring transducer and connecting the extension to the measuring transducer, wherein the extension is a software module that can be uploaded to the measuring transducer to expand a functional scope of the measuring transducer;
establishing a data communication between the extension and the measuring transducer;
forming an asymmetric cryptosystem between the extension and the measuring transducer; and
interacting the extension with the measuring transducer.

* * * * *